United States Patent Office 3,489,923

Patented Jan. 13, 1970

3,489,923

CIRCUIT FOR SWITCHING TWO OPPOSING POTENTIAL SOURCES ACROSS A SINGLE LOAD

Harcharan Singh Dahele, Harlow, England, assignor to A. C. Cossor Limited, Harlow, England Filed Nov. 29, 1966, Ser. No. 597,754

Claims priority, application Great Britain, Dec. 3, 1965, 51,466/65

Int. Cl. H03k *17/02*

U.S. Cl. 307—241 7 Claims

ABSTRACT OF THE DISCLOSURE

Switching circuitry for switching voltage sources of opposite polarity across a load, such as a PIN diode. A first source is connected in series with a first switch means to the load. A second switch means in series with the first switch means is connected across the second source and across the load. When both switch means conduct, the first source is applied across the load and the second source is shorted out. When both switch means are non-conductive, the first source is blocked and the second source is applied across the load.

Figures 1, 2:
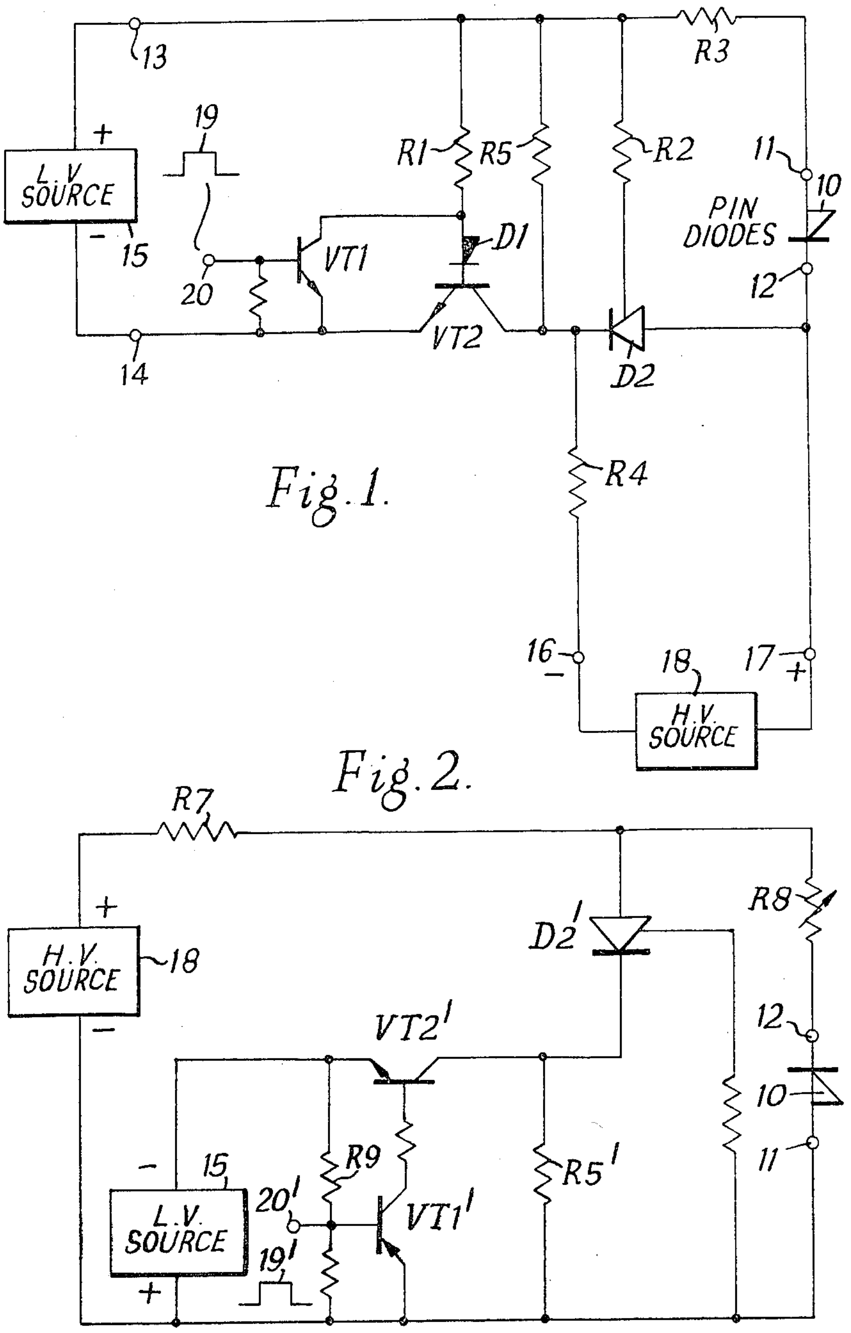

The present invention relates to switching circuits for connecting either one of two electrical sources to a load. Such circuits are particularly, though not exclusively, useful for connecting one of two power sources to one or more PIN diodes. Such diodes have a low forward impedance which can be controlled by varying the forward current, and a high reverse impedance. PIN diodes therefore find application as modulators, switches and attenuators in microwave circuits, where depending on the bias, a PIN diode can be used as an open circuit, or a near short circuit or a match.

For switching PIN diodes between their various states a switching circuit is required which allows a low voltage source or a high voltage source to be connected with the appropriate polarity to the PIN diodes. It is preferable that the switching circuit should be able to change the state of the PIN diodes in a very short time, for example less than 20 microseconds.

According to the present invention there is provided a switching circuit for effectively connecting a load to either a first or a second input circuit, comprising first and second switch means, a first input circuit being connected in series with the first switch means and a load, and the second switch means being so connected in parallel with a second input circuit and with the load that when the second switch means conducts the second input means is short circuited with respect to the load, and control means for rendering the first and second switch means conductive at the same time, or non-conductive at the same time, as desired.

Thus when both switch means are conductive the first input circuit is connected to the load, and the second input circuit is short circuited, and when neither switch means conducts the first input circuit is disconnected from the load, and the second input circuit is no longer short circuited.

In this specification, effective connection between the load and an input circuit means a connection by virtue of which change of voltage or current at the input circuit causes a change of voltage or current at the load. For example where an input circuit connected to a load, becomes short circuited then a change of voltage or current in the input circuit will not cause a corresponding change at the load. The input circuit is not therefore effectively connected to the load after the short circuit has been applied.

Each input circuit may be an electrical source, by which is meant a source of steady DC or AC such as a battery or an AC generator, or a source of varying DC or AC signals.

The first and second switch means may comprise a first transistor and a semiconductor controlled rectifier so coupled that when the control means renders the first transistor conductive, the rectifier is so connected to a suitable power supply that it also conducts. The control means may then include a further transistor so coupled to the first transistor, that when the further transistor does not conduct the first transistor conducts, and vice-versa. A pulse source controls the further transistor by applying a pulse to its base whenever it is to conduct. Alternatively the further transistor may be biased to conduct unless a pulse is applied to its base.

The second switch means may be a transistor, instead of a controlled rectifier.

The two sources may be DC power supplies and the load may be one or more PIN diodes to which one of the two power supplies are to be connected depending on which state, that is reverse or forward biased, the diodes are to take up. In this case the polarity of the voltage applied to the diodes will be different for each state. One source is connected to one pair of terminals and the other source to the other pair of terminals, with the polarities of the sources and the direction of conduction of the first transistor, and the controlled rectifier being such that when the first transistor and the controlled rectifier conduct, or do not conduct the PIN diode or diodes are forward or reverse biased respectively.

The invention will now be described by way of example with reference to the accompanying drawings in which:

FIG. 1 is a circuit diagram of a switching circuit according to one embodiment of the invention, and FIG. 2 is a circuit diagram of a switching circuit according to another embodiment of the invention.

Referring to FIG. 1, one or more PIN diodes 10, connected between terminals 11 and 12, take up one state when they are connected by way of terminals 13 and 14 to a relatively low-voltage high-current source 15, and their other state when connected by way of terminals 16 and 17 to a relatively high-voltage low-current source 18, the polarities of the sources being as shown.

A square-wave control signal 19, controlling switching between states of the PIN diodes is applied by way of a terminal 20 to a transistor VT1 which conducts only when its base is taken positive by the switching signal. When the transistor VT1 does not conduct, a transistor VT2 conducts drawing its base current through a resistor R1 and a diode D1, and the source 15 is connected by way of a resistor R2 to the control electrode of a semiconductor controlled rectifier D2 which therefore conducts. The source 15 is now connected across the PIN diodes 10 with the terminal 11 positive, and a "forward" current flows through the diodes, the magnitude of this current being determined by the choice of a resistor R3. The source 18 is short circuited by the controlled rectifier D2, and its output current is limited by a resistor R4.

When the square-wave control signal 20 goes positive the transistor VT1 conducts and the base current of the transistor VT2 is diverted through the transistor VT1. The transistor VT2 ceases to conduct and the terminal 14 is disconnected from the controlled rectifier D2 whose control current through the resistor R2 also ceases. The anode to cathode current of the rectifier D2 is made in these circumstances to fall below threshold by suitable choice of the resistor R4. Now the circuit between the source 15 and the PIN diodes 10 is broken, and the short circuit between the terminals 16 and 17 is removed. A circuit between the PIN diodes and the source 18 is completed by a resistor R5, with the result that terminal 11 is now the negative terminal of the PIN diodes and a "reverse" current mainly determined by the PIN diode reverse current flows through resistors R3, R4 and R5.

If desired, the control signal 19 can be periodic so that the PIN diodes are alternately switched between their two states.

A second embodiment of the invention will now be described with reference to FIG. 2. When a positive-going pulse 19′ is applied to a terminal 20′ transistors VT1′ and VT2′ cease conduction and a semiconductor controlled rectifier D2′ also ceases conduction. In this condition the high-voltage low-current source 18 is connected by way of a resistor R7 and a variable resistor R8 to reverse bias the PIN diode or diodes 10.

When pulses are not applied to the terminal 20′ both the transistor VT2′ and the rectifier D2′ conduct. Now the low-voltage high-current source 15 is connected by way of the transistor VT2′, the rectifier D2′ and the resistor R8 to the PIN diode or diodes. Since the high-voltage source is now short-circuited by way of the rectifier D2′; and the parallel circuit comprising in one arm the transistor VT2′ and the low-voltage source 15, and in the other resistor R5′, the PIN diode or diodes 10 are now forward biased.

If a resistor R9 is removed, the transistors VT1′ and VT2′ conduct only when a negative-pulse is applied to the terminal 20′. Hence the PIN diode or diodes 10 are forward biased when pulses are applied and reverse biased at other times.

In the above or other embodiments of the invention the controlled rectifiers D2 or D2′ may be replaced by a transistor having suitable switching, and collector-emitter breakdown, characteristics. Similarly as will be clear to those familiar with the art, the polarities of the sources may be reversed if the circuit is rearranged and/or the polarities of the transistors are changed.

In one practical embodiment of the circuit of FIG. 1 with which the desired speed of changeover between states of the PIN diodes was achieved, the following components were used:

Source 15—6 v., 1 a.
Source 18—100 v., 10 ma.
Signal 19—0 v. or 2 v. alternately
Resistor R1—270Ω
Resistor R2—390Ω
Resistor R3—100KΩ
Resistor R4—22Ω
Resistor (between terminal 14 and the base of VT1)—1KΩ

What is claimed is:

1. A switching circuit comprising
first and second sources of opposite potentials, respectively;
a load; and
means for selectively applying the two potentials across the load, said means comprising
first and second switch means;
said first source being connected in series with the first switch means and said load;
said second switch means being connected in parallel with said second source across said load and said second switch means being in series with said first switch means;
whereby when said first and said second switch means both conduct said first source supplies said load and said second source is short circuited and when said first and said second switch means are both non-conductive said second source supplies said load and said first source is blocked.

2. A switching circuit, according to claim 1, and further including an impedance element connected in series with said second source and said load, said impedance element forming a shunt path with respect to said first source for current from said second source.

3. A switching circuit, according to claim 1, wherein said first source is connected in series with said second switch means and said second source.

4. A switching circuit, according to claim 1, wherein said load includes at least one PIN diode.

5. A switching circuit, according to claim 1, wherein said first switch means includes a transistor;
said second switch means includes a semiconductor-controlled rectifier having a control electrode, said transistor being coupled to said semiconductor-controlled rectifier to allow a voltage to be applied to said control electrode thereof to cause said rectifier to conduct when said transistor conducts.

6. A switching circuit for effectively connecting at least one PIN diode to either a low direct-voltage electrical source, or a high direct-voltage source, comprising at least one PIN diode, a low direct-voltage source, a first transistor, having a base electrode, a semiconductor controlled rectifier connected in series with said PIN diode, said low direct-voltage source and said first transistor, said rectifier being coupled to said first transistor to conduct when said first transistor conducts a high direct-voltage source, an impedance element, said high direct-voltage source being connected in parallel with said rectifier, and with said impedance element and said PIN diode, and a second transistor coupled to said base electrode of said first transistor to cause said first transistor to conduct or not conduct in dependence on a signal applied to said second transistor, said first transistor, when conducting, connecting said low direct-voltage source to said PIN diode and said rectifier, when conducting short circuiting said high direct-voltage source, relative to said PIN diode.

7. A switching circuit for effectively connecting at least one PIN diode to either a low direct-voltage electrical source, or a high direct-voltage source, comprising at least one PIN diode, a low direct-voltage source, a first transistor, having a base electrode, a semiconductor controlled rectifier connected in series with said PIN diode, said low direct-voltage source and said first transistor, said rectifier being coupled to said first transistor to conduct when said first transistor conducts a high direct-voltage source, said rectifier, said first transistor and said low direct-voltage source being connected in series with each other, and in parallel with said high direct-voltage source and a second transistor coupled to said base electrode of said first transistor to cause said first transistor to conduct or not conduct in dependence on a signal applied to said second transistor, said first transistor, when conducting, connecting said low direct-voltage source to said PIN diode and said rectifier, when conducting short circuiting said high direct-voltage source relative to said PIN diode.

References Cited

UNITED STATES PATENTS 3,290,519 12/1966 Ross -------------- 307—255

DONALD D. FORRER, Primary Examiner
D. M. CARTER, Assistant Examiner

U.S. Cl. X.R.

307—252, 253